United States Patent [19]

Fonsalas et al.

[11] Patent Number: 4,935,813
[45] Date of Patent: Jun. 19, 1990

[54] SYSTEM OF TRANSMITTING HIGH-DEFINITION TELEVISION PICTURES VIA A RELATIVELY NARROW PASSBAND CHANNEL, AND ALSO A TRANSMITTER AND A RECEIVER SUITABLE FOR THE SYSTEM

[75] Inventors: Frédéric L. J. Fonsalas, Grigny; Jean-Yves L. Lejard, Paris; Pascal F. P. Hayet, Chatenay Malabry; Marcel R. Le Queau, Ozoir La Ferriere, all of France

[73] Assignee: U.S. Philips Corporation, New York, N.Y.

[21] Appl. No.: 173,681

[22] Filed: Mar. 24, 1988

[30] Foreign Application Priority Data

Mar. 24, 1987 [FR] France ................................. 8704071

[51] Int. Cl.⁵ ............................................. H04N 7/12
[52] U.S. Cl. ........................................ 358/138; 358/12
[58] Field of Search .................... 358/12, 13, 138, 133

[56] References Cited

U.S. PATENT DOCUMENTS 4,743,965  5/1988  Yamada et al. .................... 358/88
4,782,387 11/1988  Sabri et al. ........................ 358/12 X

FOREIGN PATENT DOCUMENTS 0146713 7/1985 European Pat. Off. .
0174058 3/1986 European Pat. Off. .
2302645 9/1976 France .

Primary Examiner—James J. Groody
Assistant Examiner—Victor R. Kostak
Attorney, Agent, or Firm—Edward W. Goodman

[57] ABSTRACT

A system for use with D2-MAC/ packets contains, on the one hand, a transmitting part formed by a pick-up member (1) for producing said pictures constituted by a plurality of picture elements or samples distributed over even and odd lines, a filter member (22) for filtering the samples of the filtered samples, a sub-sampling member (20) for taking certain samples from the output of the filter member and a transmission circuit (5) for transmitting through the channel the certain samples taken and, on the other hand, at least one receving part constituted by a receiving circuit (10), an interpolation member (41) for recovering samples on the basis of the certain samples received, and a first display circuit (50) for the recovery of a high-definition picture; the sub-sampling member (20) is designed to take from the pictures supplied by the pick-up member a predetermined number of samples in three consecutive fields.

6 Claims, 12 Drawing Sheets

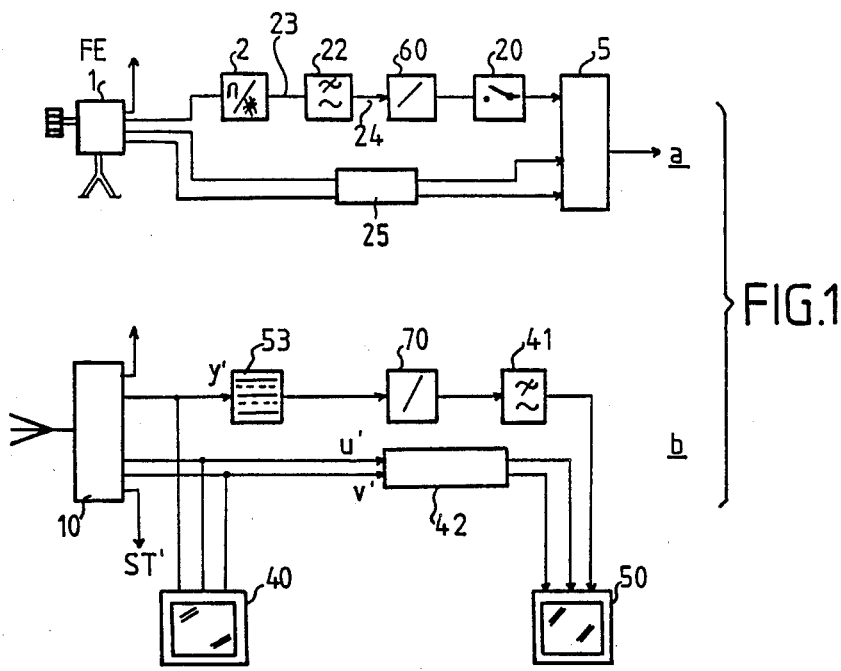
FIG.1
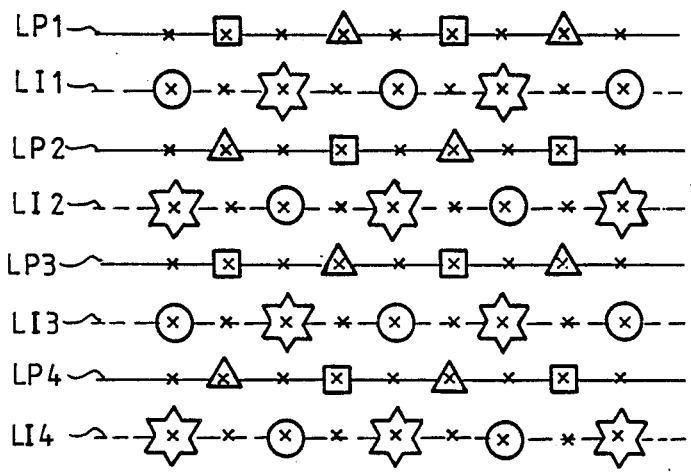
FIG.2 PRIOR ART
□ : t+4kT
☆ : t+(4k+1)T
△ : t+(4k+2)T
○ : t+(4k+3)T
FIG.3 PRIOR ART ☐ : t+3kT
△ : t+(3k+1)T
○ : t+(3k+2)T

FM= FF* F1

$\longrightarrow$ $t + 4.k.T$
$\Longrightarrow$ $t + (2k+1).T$
$\dashrightarrow$ $t + (4k+2).T$

SYSTEM OF TRANSMITTING HIGH-DEFINITION TELEVISION PICTURES VIA A RELATIVELY NARROW PASSBAND CHANNEL, AND ALSO A TRANSMITTER AND A RECEIVER SUITABLE FOR THE SYSTEM

BACKGROUND OF THE INVENTION

The present invention relates to a system for the transmission of high definition pictures via a relatively narrow passband channel, the system comprising a transmission part formed by a picture pick-up member for providing said pictures which are constituted by a plurality of picture elements or samples distributed over even and odd lines, a filter member for filtering said samples, a sub-sampling circuit for taking certain samples of said filtered samples from the output of the filter member and a transmission circuit for transmitting said certain samples via the channel in accordance with transmission fields, and also at least one receiving part formed by a receiving circuit for receiving the certain samples coming from the transmission circuit, an interpolation member for recovering samples on the basis of the received certain samples and a first display circuit for reconverting the recovered samples and the received certain samples into a restored high-definition picture.

The present invention also relates to a transmitter and a receiver suitable for the system.

Systems of this type are well known and are used with great advantage more specifically in the transmission of high definition pictures which are compatible with the "MAC" standards and more particularyly the "D2-MAC" standard (recommendation 601 of the C.C.I.R.).

A prior art system of this type is described in the article "A SINGLE CHANNEL HDTV BROADCAST SYSTEM-THE MUSE-" by Yuichi Ninomiyha et al..., published in the periodical "NHK LABORATORIES NOTE" vol. 304 of Sept. 1984. This MUSE system, which is not adapted to the said standards, can easily be rendered suitable for these standards by linearly modifying its characteristic parameters. This known system utilizes, for the transmission of the samples of a picture, a sampling structure which extends over four fields. Picture elements belonging to the differential spatial positions are transmitted in these four consecutive fields; when the processed picture is a still picture, a good quality is obtained. On the other hand, the transmission in four fields does not render it possible to obtain a good quality for the recovery of moving pictures whose portions move perceptibly during four consecutive fields.

SUMMARY OF THE INVENTION

One of the objects of the present invention is to obviate this drawback to a certain extent and consequently to enable the recovery, with a better quality, of the moving pictures.

Since the high-definition pictures have an aspect ratio of 16/9 (picture width divided by picture heigth), which is close to the aspect ratio of a movie picture frame, then the requirement is imposed that the number of recovered picture elements along the horizontal and vertical axes of the picture must be in substantially the same ratio.

A further object of the invention is to satisfy this requirement.

To accomplish these objects, a system of the type defined in the opening paragraph is characterized in that the sub-sampling circuit is designed to take a certain number of samples from the picture supplied by the pick-up member and to apply them in three consecutive fields to the transmission circuit.

In accordance with an important feature of the invention, the sub-sampling circuit is designed to take, in sequences of six samples which succeed each other in the lines and are shifted from line to line, the first samples of the sequences for the first field, the fifth samples of the second field and the third samples for the third field.

In addition to the possibility of transmitting high definition pictures, also a compatibility with a system comprising, for example, receivers of the D2-MAC/-packet type is required.

Thus, in accordance with a further feature of the invention, there is provided, to ensure a good compatibility for the recovery of the picture having a normal definition at the receiving side, a sub-sampling circuit designed to apply to the transmitter circuit a series of samples in four fields, in an order referred to as the "compatible order":
- the first field being formed by first transmitted samples from said sequences, taken alternately from the subsequent line,
- the second field being formed by fifth transmitted samples from the sequences, taken alternately from one line and the subsequent line,
- the third field being formed by third transmitted samples from the sequences, taken alternately from one line and the subsequent line,
- the fourth field being formed by fifth transmitted samples from the sequences, taken alternately from one line and the subsequent line.

BRIEF DESCRIPTION OF THE DRAWINGS

The following description which is given by way of non-limitative example with reference to the accompanying drawings will make it better understood how the invention can be put into effect.

In the drawings:

FIG. 1 shows a transmission arrangement according to the invention.

FIG. 2 shows the sampling structure of a prior art system.

FIG. 3 is a legend for FIG. 2.

DETAILED DESCRIPTION OF THE INVENTION

Figure 4:
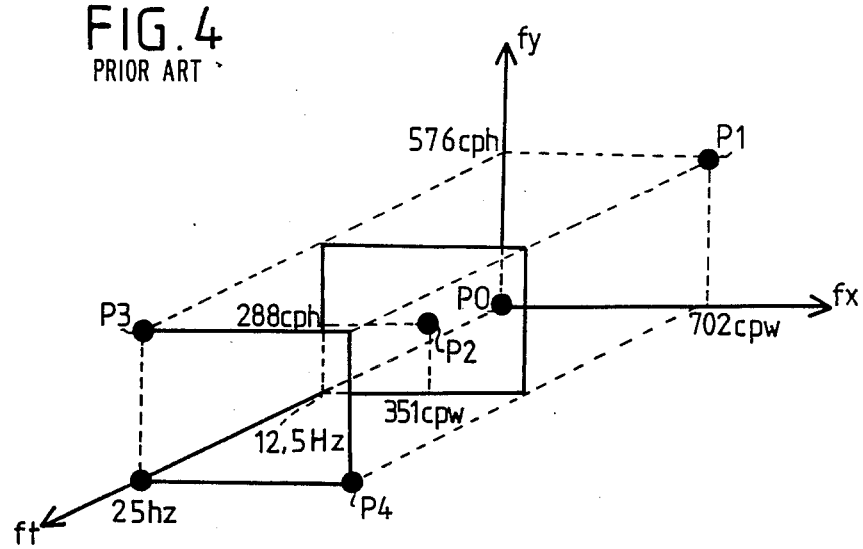
FIG. 4 shows the picture elements in the Fourier space around which the image spectra are produced and which relate to the structure of FIG. 2.

The arrangement of FIG. 1 is comprised of a transmission part shown at a and a receiving part shown at b.

In this FIG. 1, reference numberal 1 denotes a high-definition television camera supplying in analog from the luminance signal Y and the color difference signals U and V. In the present description, the luminance signals are of main interest as these signals cause the majority of the problems during transmission. A processing operation similar to the one just described can be effected on the signals U and V, however with a much lower rate. An analog-to-digital converter 2 produces the different digital samples each of which represents the luminance of a picture element. These samples occur at the instants $t, t+TP, t+2TP, \ldots$ where $TP=1/(54 \text{ MHz})$ and define an interlaced picture having 1250 lines, which is double the definition of the conventional, normal 625-line pictures, both in the vertical and in the horizontal direction. As one wants to transmit this picture via a transmission circuit 5-10 which operates in accordance with a MAC television transmission standard and is formed by a transmission circuit 5 and a receiver circuit 10, only some of these samples must be transmitted. For that purpose, a sub-sampling circuit 20 is used which is preceded by a filter member 22 having an input terminal 23 and an output terminal 24. The signals U and V are submitted to the same processing operation effected by a member 25 at a twice lower frequency.

The receiving circuit 10 applies the luminance signals and the color difference signals Y', U' and V'to, respectively, a television set 40 for the recovery of a normal-definition television picture and also to interpolation members 41 and 42 for processing the additional picture elements on the basis of the elements received, in such manner that a second television set 50 produces a high-definition picture.

In accordance with the above-described feature which ensures the compatibility, a change-of-order member 53 is provided at the receiving side, which changes the order of appearance of the samples at the output of the receiving circuit in a manner still to be described hereinafter.

For a proper understanding of the invention, FIG. 2 shows the sampling structure of the "MUSE" arrangement. All the samples at the output of the converter 2 are represented by crosses and are distributed according to the even lines LP drawn in solid lines . . . LP1, LP2, LP3, LP4, . . . and odd lines LI drawn in broken lines LI1, LI2, LI3, LI4. The sub-sampling member of the known system transmits in a first field transmitted at the instant t or $(t+kt)$, wherein $k=0, 1, 2, \ldots$ and $T=$the duration of a field, all the samples surrounded by a square box. These samples are taken one out of four from the even lines and in quincunx. Thereafter the sub-sampling circuit transmits in a second field at the instants $t(4k+1)T$ all the samples which are enclosed in a star. These samples are taken one out of four from the odd lines and in quincunx, and are shifted horizontally by one position relative to those transmitted at the instant t.

Thereafter, at the instants $t+(4k+2)T$ the samples surrounded by a triangle are transmitted in a third field. The samples are taken from the even lines, one sample out of four, and are shifted horizontally through two positions with respect to the samples enclosed in a box. Finally, at the instant $t+(4k+3)T$, the samples surround by a circle are transmitted in a fourth field. These samples are taken from the odd lines, one sample out of four, and are shifted horizontally through two positions relative to the samples enclosed in a star.

FIG. 3 is a legend of symbols which represents the transmission in each field of the different samples, which appear sequentially at the instants $4+kT$, $t+(4k+1)T$, $t+(4k+2)T$, $t+(4k+3)T$.

A periodical structure in the Fourier domains corresponds to any space-time periodic sampling structure. On this subject reference is made to the article by KRETZ and SABATIER, "Echantillonnage des images de télévision" published in the Annales de Télécommunications 36, number 3-4, 1981, pages 231-273. There it is demonstrated that the structure in the Fourier domain shown in FIG. 4 corresponds to the structure of FIG. 2. In this Figure, the picture elements which are the centers of the space-time spectra of the pictures are denoted by P0, P1, P2, P3 and P4. These picture elements are referenced by the axes fx, fy and ft, which are graduated in cpw (horizontal definition unit corresponding to the cycles per picture width), in cph (unit corresponding to the cycles per picture height) and in Hz, respectively.

The picture element P0 is at the origin. The picture element P1 is defined by $fx=702$ cpw, $fy=576$ cph and $ft=0$ Hz, the picture element P2 by $fx=351$ cpw, $fy=288$ cph and $ft=12.5$ Hz, the picture element P3 by $fx=0$ cpw, $fy=576$ cph and $ft=25$ Hz, the picture element P4 by $fx=702$ cpw, $fy=0$ cph and $ft=25$ Hz.

To prevent the spectra which occur around these picture elements from overlapping, it will be obvious that a filtering operation is necessary before sub-sampling the signal.

Figure 5:
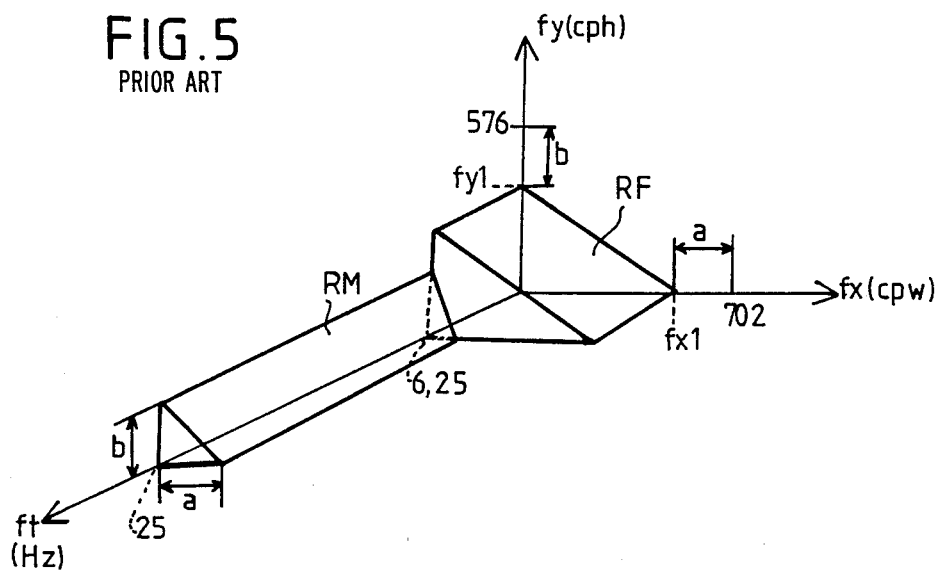
FIG. 5 shows, in outline a support for the transfer function of the prior art system.

FIG. 5 shows a filtering domain suitable for the sampling structure of FIG. 4. This filtering domain is a space within which the transfer function of an ideal filter would be. "1" and outside which this function would be zero. This filtering domain is formed by two regions RF and RM. The region RF is placed near the zero time frequency plane and its expansion in the directions fx and fy is more important than the second region RM situated at much higher time frequencues. In pratice, these two regions correspond for the first RF in the case of still (fixed) pictures or slow-moving animated pictures and for the RM in the case of rapidly moving pictures. Applicants appreciate, when one wants to avoid any overlap of the spectrum after sub-sampling, that this puts a constraint on the maximum extension of these two zones RF and RM along the axes fy and fx.

Put more accurately, the sum of the resolutions, along the axes with regard to the almost still pictures and moving pictures must not exceed half the sampling rate. Thus, referring to FIG. 5, the region RF intersects the axis fx in a point fx1 and the axis fy in a point fy1, while the region RM extends along the axis fx up to a distance "a" and along the axis fy up to a distance "b". If, on the one hand, Rvf and Rhf are denoted the vertical and horizontal resolutions of the still pictures and, on the other hand, Rvm and Rhm are denoted the vertical and horizontal resolutions of the moving pictures, then:

Rhf=fx1
Rhm=a
Rvf=fy1
Rvf=b

Considering the coordinates of the point P1, the best results are:

Rhf+Rhm=702 cpw
Rvf+Rvm=576 cph.

When values are chosen which are considered to be appropriate for the natural pictures for the parameters a, b, fx1, fy1, it is for example, possible to obtain:

Rhf=421.2 cpw, Rvf=345.6
Rhm=280.8 cpw, Rvm=230.4

In addition to the sum condition mentioned, it will be obvious that the point P2 limits at fy and fx the development of the regions RM while extending it towards ft=0. This explains the first drawback which consists in a poor recovery of the mobile pictures.

The second drawback follows from the values Rhf and Rvf mentioned above. Acutally, when their ratio is assumed to be p it is found that:

$$\rho = \frac{Rhf}{Rvf} = 1.22$$

This ratio must approach the cinema format 16/9. In order to obtain a good visual impression from this format, the same number of picture elements must be visual in the horizontal and the vertical directions; the ratio p is then too low.

To avoid these drawbacks, in accordance with the invention, the sub-sampling member 20 is designed to take samples from the pictures originating from the pick-up member 1 and to supply them in three consecutive fields. For that purpose, in FIG. 1, a change-of-transmission rate member 60 is provided to change from a rate 1/54 MHz to 1/81 MHz, interposed between the filter member 22 and the sub-sampling member 20 and a change-of-receiving rate member 70 is interposed between the interpolation member 41 and the change-of-order member 53 to change from a rate of 1/81 MHz to 1/54 MHz. The sub-sampling member 20 will take the samples from the output of the member 60 in the following manner, in the order referred to as the "normal order".

Figures 6, 7:
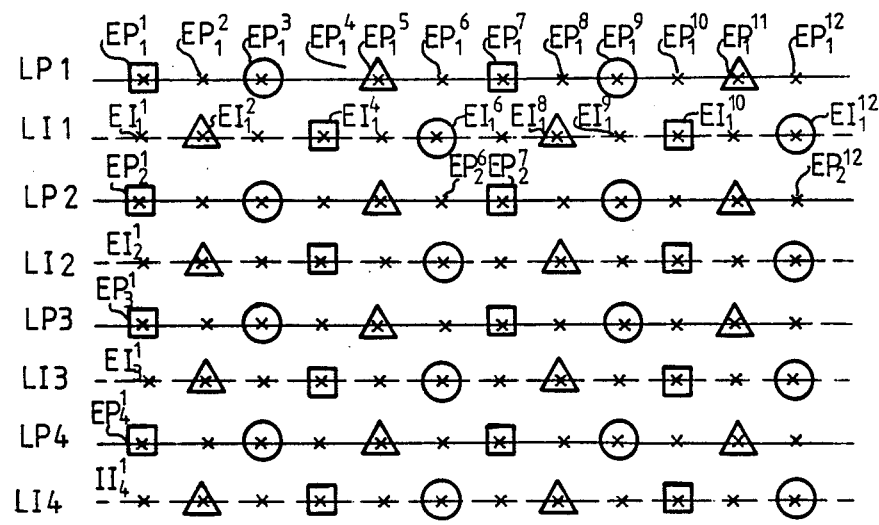
FIG. 6 shows the sampling structure according to the invention.
FIG. 7 is a legend for FIG. 6.
Figure 8:
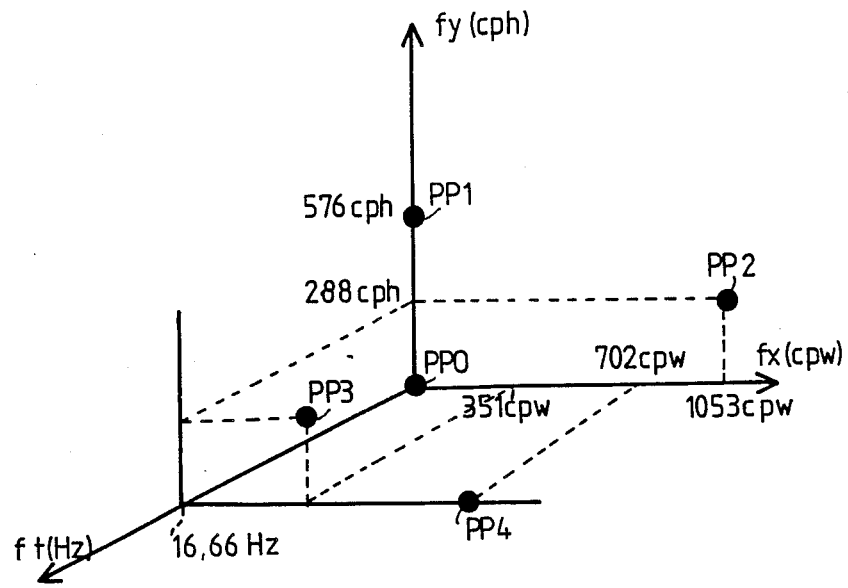
FIG. 8 shows the picture elements of the Fourier space around which the image spectra are produced and which relate to FIG. 6.

FIG. 6, like FIG. 2, represents, by means of crosses, the samples produced by the member 60. These samples are supplied one after the other for consecutive lines. The different samples $EP^1{}_1$, $EP^2{}_1$, ... $EP^{12}{}_1$ are found on line LP1, the samples $EI^1{}_1$, $EI^2{}_1$, ... at the line LI1. It will be clear that the second reference letter of these samples indicate the parity of the line in which they appear (P=even and I=odd), the superscript index indicates their relative location in the line under consideration, the subscript index denotes the number of the even or odd line.

According to the invention, the samples are examined in sequences of six samples. For even lines these sets are disposed one below the other. Thus for the line LI1, a first sequence will comprise the samples ($EP^1{}_1$, ..., $EP^6{}_1$), a second sequence ($EP^7{}_1$, ... $EP^{12}{}_1$), and for the line LP2 sequence will comprise the samples $EP^1{}_2$, ... $EP^6{}_2$, a second sequence $EP^7{}_2$, ... $EP^{12}{}_2$.

Although the sequecnces in even lines must be placed one below the other, they are shifted relative to the sequences in the odd lines. Thus, a sequence of samples in the odd lines containing the samples $EI^4{}_1$, $EI^5{}_1$, $EI^6{}_1$, ... $EI^9{}_1$, is shifted to the right through three sampling positions relative to the sequence containing the samples $EP^1{}_1$, $EP^2{}_1$, ..., $EP^6{}_1$. From the samples forming the pictures, one sample out of two will be transmitted in three consecutive fields. In a first field, the samples enclosed in a square box will be transmitted first, that is to say the first samples of the sequence of six samples:

... $EP^1{}_1$, $EP'{}_1$, ... for the line LP1;
... $EI^4{}_1$, $EI^{10}{}_1$... for the line LI1, ... etc.

In a second field the samples enclosed in a triangle are transmitted, that is to say the fifth samples of said sequences, namely:

the samples ... $EP^5{}_1$, $EP^{11}{}_1$, ... for the LP1,
the samples ... $EI^2{}_1$, $EI^8{}_1$, ... for the line LI1.

In a third field the samples enclosed in a circle will finally be transmitted, that is to say the third samples of said sequences, namely;

the samples ... $EP^3{}_1$, $EP^9$, ... for the line LP1,
the samples ... $EI^6{}_1$, $EI^{12}{}_1$, ... for the line LI1.

FIG. 7 is the list of symbols recalling the distribution of the samples in their respective field, that is to say at the instants t+3kT, t+(3k+1)T, t+(3k+2)T.

A periodical structure in the Fourier domain corresponds to this sampling structure of FIG. 6. The points PP0, PP1, PP2, PP3 and PP4 are the space-time spectra of the pictures. The coordinates of these picture elements are as follows:

| | |
|---|---|
| PP0 : (0 Hz, ) cpw, 0 cpw) | PP1 : (0,576 cph, 0 cpw) |
| PP2 : (0 Hz, 288 cph, 1053 cpw) | PP3 : (16,66 Hz, 288 cph, 350 cpw) |
| PP4 : (16,66 Hz, 0 cpw, 702 cpw). | |

Figure 9:
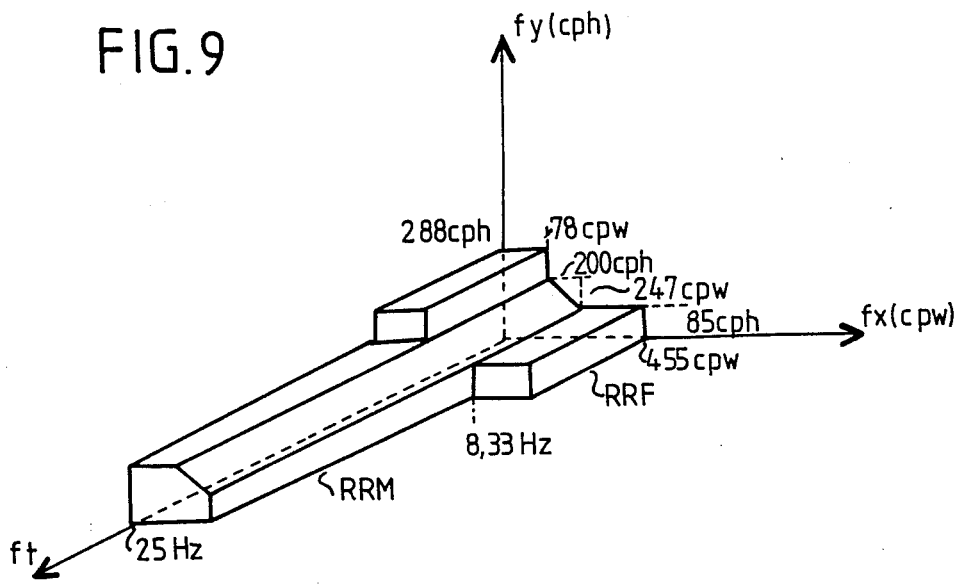
FIG. 9 shows a support of the transfer function of a filtering member suitable for the invention.

FIG. 9 shows a possible support of the transfer function retained for this sampling structure. This support will be approximated by the realization to be described. Rectangular shapes which are more easily approximated by the filters described hereinafter are preferred to the triangular shapes shown in FIG. 5. The region relating to still (fixed) pictures is denoted by RRF and the region relating to moving pictures is denoted by RRM. These two regions are separated by a plane which is defined by ft=8.33 Hz.

The region RRM, which is in the form of a prism, is defined on the basis of the segments which link the following points of the plane fx, fy:

(0 cpw, 288 cph) (78 cpw, 288 cph) (78 cpw, 200 cph) (247 cpw, 85 cph) (455 cpw, 85 cph) and (455 cpw, 0 cph).

The region RRM, which is also in the form of a prism, is defined on the basis os the segments which link the following points of plane fx, fy:

(0 cpw, 200 cph), (78 cpw, 200 cph), (247 cpw, 85 cph) and 247 cpw, 0 cph).

It is then possible to obtain a picture ratio e=1.58 which is much closer to the cinema format.

Figure 10:
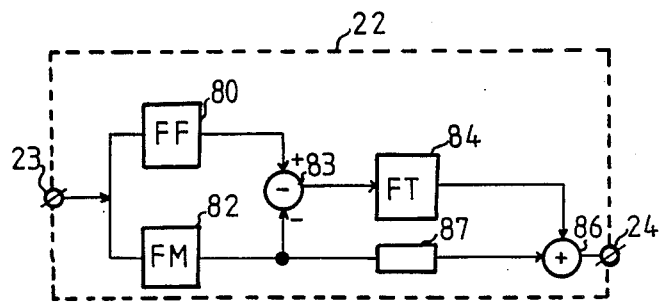
FIG. 10 is a detailed representation of a possible structure of the filter member.

FIG. 10 shows a first structure of the filter member 22. It is constituted by a first filter FF 80 for still pictures and a second filter FM 82 for moving pictures 82. Inputs of these filters are connected to the input 23 and outputs of these filters are connected to the (+) and (−) inputs, respectively, of a subtractor 83. An output of this subtractor 83 is connected to an input of a temporal filter FT 84. An adder 86 takes the sum of the samples supplied by this filter 84 and a time delay member 87, an input of which is connected to the output of the filter 82. An output of the adder 86 constitutes the output 24 of the member 22.

Figure 11:
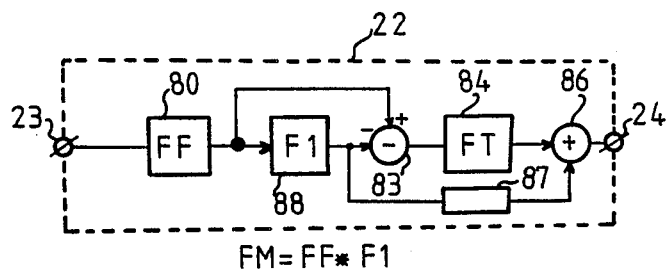
FIG. 11 is a detailed representatioon of a preferred structure of the filter member.

The structure shown in FIG. 11 is preferred to this structure. Here the filter 82 is replaced by a combination of the filter FF 80 and a filter F1 88, so that the principal function of the filter F1 is FM=FF * F1 where FM, FF are the transfer functions of the filters 82 and 80 and wherein the symbol * represents the convolution product.

Figure 12:
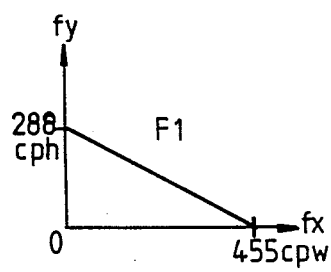
FIG. 12 shows the support of the transfer function of a first filter.
Figure 13:
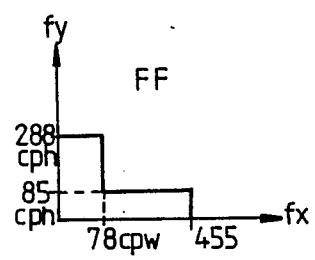
FIG. 13 shows the support of the transfer function of a second filter.

In the plane fx, fy the FIG. 12 shows the transfer function F1 which is a straight line passing through the points fx=0, fy=288 cph, fx=485 cpw and fy=0 cph, while FIG. 13 shows the transfer function FF formed by a plateau fy=288 cph extending from fx=0 cpw to 78 cpw, and a plateau fy=85 cph extending 78 cpw to 455 cpw.

Figure 14:
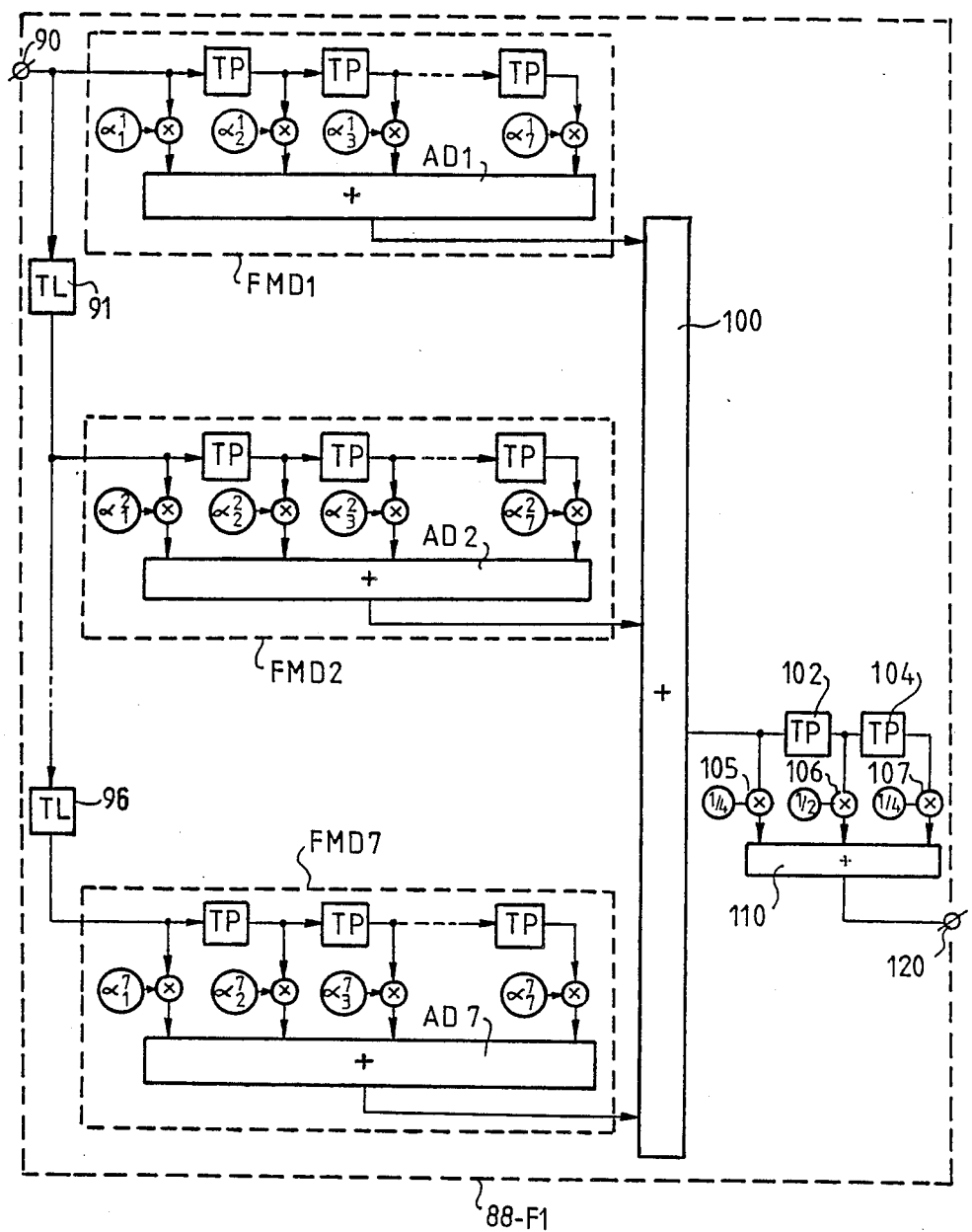
FIG. 14 is a detailed representation of the structure of the first filter.

FIG. 14 is a detailed illustration of the filter 88 F1. It is formed by a plurality of mono-dimensional filters FMD1, FMD2, ..., FMD7. Each of these filters is formed from a chain of time delay elements which produce a time delay PP equal to the time separating two picture elements produced by the camera 1. On the basis of this chain, different branching points are established to ensure that the samples delayed by this chain are multiplied by coefficients $a^{ij}$, wherein the index "i" refers to the number of the monodimensional filter and the index "j" refers to the branching order; j=1 represents the sample currently present at the input of the chain and j=7 represents the most delayed sample. An input of the filter FMD1 is connected to an input 90 of the filter 88 and inputs of the other filters FMD2 to FMD7 are connected to outputs of delay elements 91, ..., 96 each of which produces a time delay TL equal to the duration of one line. Outputs of the filters FMD1 to FMD7 are constituted by outputs of adders AD1 to AD7, respectively, which then furnish the weighted sum of the samples multiplied by said coefficients $a^{ij}$. An adder 100 takes the sum of the results produced by the adders AD1 to AD7.

An output signal of the adder 100 itself is filtered by a filter constituted by two delay elements 102 and 104 producing a delay equal to TP, which are connected in cascade to an output of the adder 100. Three multipliers 105, 106 and 107 multiply by $\frac{1}{4}$, $\frac{1}{2}$ and $\frac{1}{4}$, respectively, samples at an input of the element 102, at its output, and at an output of the element 104. An adder 110 takes the sum of the results of the multipliers 105 to 107. An output 120 of the filter 88 F1 is constituted by the output of this adder 110. The coefficients $a^{ij}$ are given by the following Table I:

TABLE I

| i \ j | 1 | 2 | 3 | 4 | 5 | 6 | 7 |
|---|---|---|---|---|---|---|---|
| 1 | −1/16 | 0 | 0 | 0 | 0 | 0 | −1/16 |
| 2 | 0 | 0 | 0 | 0 | 0 | 0 | 0 |
| 3 | 0 | 0 | 9/32 | 0 | 9/32 | 0 | 0 |
| 4 | 0 | 0 | 0 | 0 | 0 | 0 | 0 |
| 5 | 0 | 0 | 9/32 | 0 | 9/32 | 0 | 0 |
| 6 | 0 | 0 | 0 | 0 | 0 | 0 | 0 |
| 7 | −1/16 | 0 | 0 | 0 | 0 | 0 | −1/16 |

Figure 15:
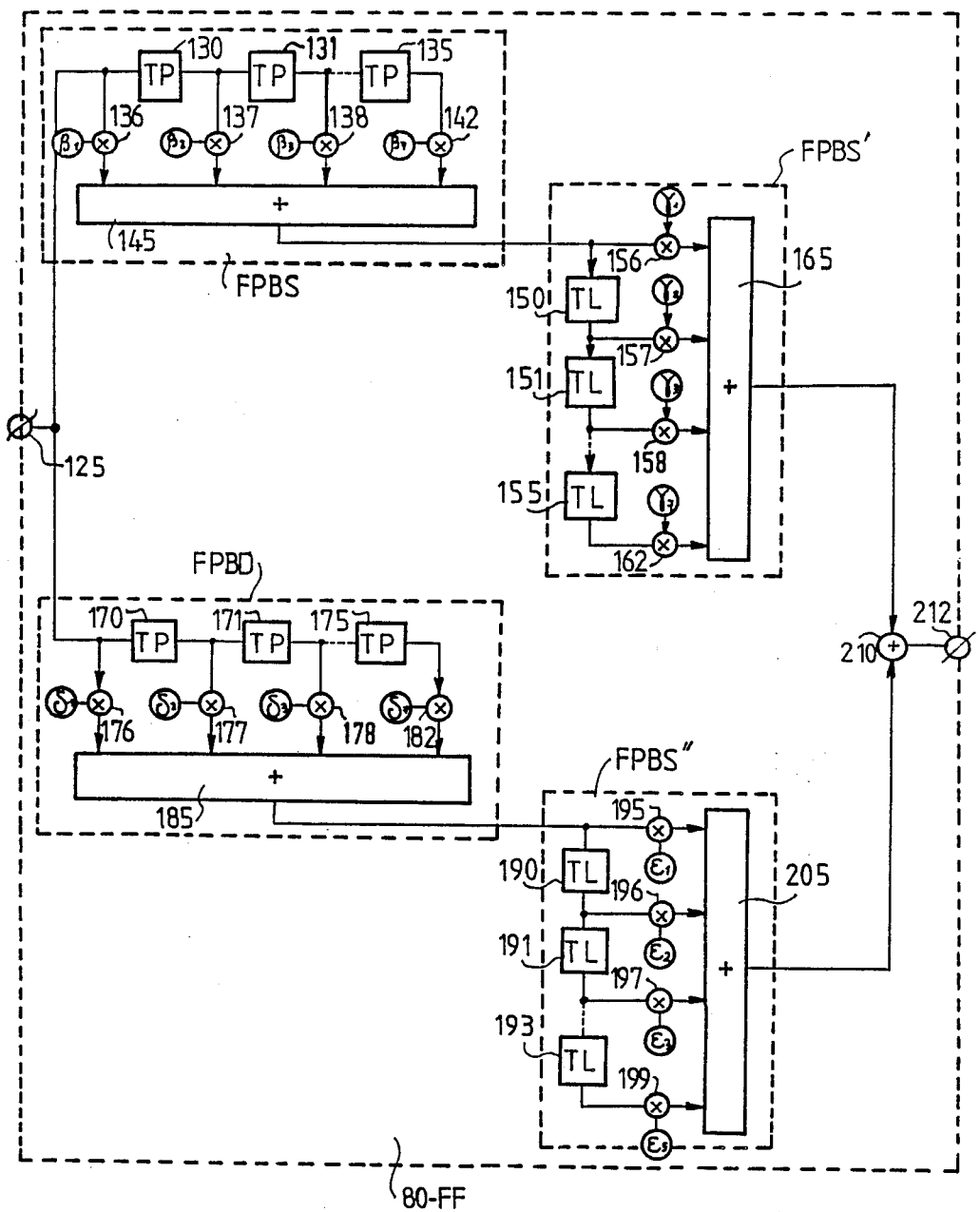
FIG. 15 is a detailed representation of the structure of the second filter.

The structure of the filter 80 is shown in FIG. 15.

It is formed by a first portion FPBS which uses a low-pass filter (cut-off frequency 78 cpw). It is connected to an input 125 of the filter 80. This portion FPBS is formed by a chain of 6 delay elements 130 to 135 each of which produces a delay equal to TP. Multipliers 136, 137, 138, ..., 142 multiply by the coefficients $\beta_1 ..., \beta_7$, respectively, samples present at an input of the element 130, at its output, and at outputs of the subsequent elements; an adder 145 takes the sum of all the results of these multiplies. The following Table II gives the value of the coefficients $\beta$.

TABLE II

| $\beta_1$ | $\beta_2$ | $\beta_3$ | $\beta_4$ | $\beta_5$ | $\beta_6$ | $\beta_7$ |
|---|---|---|---|---|---|---|
| 1/16 | 2/16 | 3/16 | 4/16 | 3/16 | 2/16 | 1/16 |

The filter FPBS is followed by a filter FPBS' which has a vertical low-pass filtering function, whose cut-off frequency is 85 cph. It is formed by a chain of 6 delay elements 150 to 155 (each producing a time delay equal to the duration TL) and 7 multipliers 156 to 162 for multiplying samples at an input of the element 150, at its output, and at outputs of the subsequent elements by the coefficients $\lambda_1, ... \lambda_7$; an adder 165 takes the sum of the results produced by the multipliers 156 to 162. The following Table III states the values of the coefficients $\lambda$.

TABLE III

| $\lambda_1$ | $\lambda_2$ | $\lambda_3$ | $\lambda_4$ | $\lambda_5$ | $\lambda_6$ | $\lambda_7$ |
|---|---|---|---|---|---|---|
| −1/16 | −3/16 | 1/16 | 6/16 | 1/16 | −3/16 | −1/16 |

A horizontal bandpass filter FPBD (transmitting the 78 cpw to 455 cpw band) is connected to the input 125 of the filter 80. This bandpass filter is formed by a chain of 6 delay elements 170 to 175, each producing a time delay equal to TP. Multipliers 176 to 182 multiply the samples at the input of the element 170, at its output and at the outputs of the subsequent elements by $\delta_1, \delta_2, ... \delta_7$ respectively. An adder 185 sums all the results produced by the multipliers 176 to 182. The following Table IV gives the value of these coefficients $\delta$.

TABLE IV

| $\delta_1$ | $\delta_2$ | $\delta_3$ | $\delta_4$ | $\delta_5$ | $\delta_6$ | $\delta_7$ |
|---|---|---|---|---|---|---|
| −1/16 | 0 | 9/16 | 16/16 | 9/16 | 0 | −1/16 |

The filter FPBD is followed by a FPBS" which uses a vertical low-pass filter whose cut-off frequency is equal to 85 cph. It is constituted by a chain of 5 delay elements 190 to 194, each producing a delay equal to TL. Multipliers 195 to 199 multiply the samples at an input of the elements 190, at its output, and at outputs of the subsequent elements by $\Sigma_1, \Sigma_2, \ldots, \Sigma_5$ respectively. An adder 205 takes the sum of all the results of the multipliers 195 to 199. The following Table V shows the values of the coefficients $\Sigma$.

TABLE V

| $\Sigma_1$ | $\Sigma_2$ | $\Sigma_3$ | $\Sigma_4$ | $\Sigma_5$ |
|---|---|---|---|---|
| −1/16 | 4/16 | 10/16 | 4/16 | −1/16 |

An output 212 of the filter 80 is formed by an output of an adder 210 which takes the sum of the samples produced by the filters FPBS' and FPBS".

Figure 16:
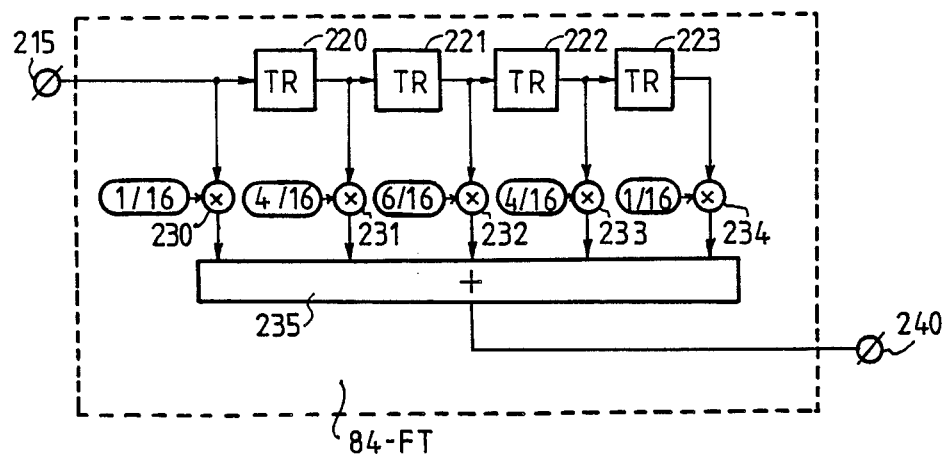
FIG. 16 is a detailed representation of the structure of a third filter.

FIG. 16 shows the structure of the filter 84. It comprises, connected to its input 215, a chain of four delay elements 220, 221, 222 and 223, each producing a time delay equal to TR (duration T of a field) and five multipliers 230, 231, 232, 233 and 234 which multiply the samples at an input of the element 220, at its output, and at outputs of the subsequent elements by 1/16, 4/16, 6/16, 4/16 and 1/16, respectively. An adder 235 applies the sum of the results produced by the multipliers 230 and 234 to an output 240 of the filter 84.

Figure 17:
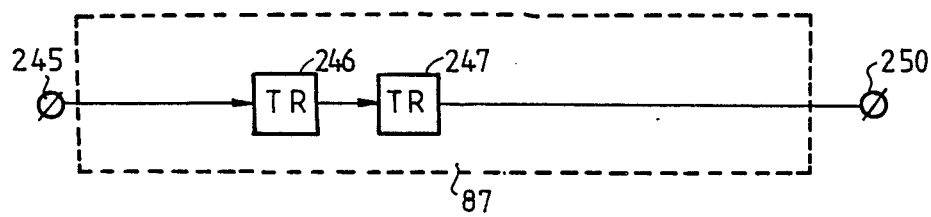
FIG. 17 is a detailed representation of the structure of a time delay member.

FIG. 17 illustrates the structure of the time shift element 87. It comprises, connected to its input 245, a delay element 246 followed by a second delay element 247 whose output constitutes an output 250 of the member 87, each of these elements producing a delay equal to TR.

Figure 18:
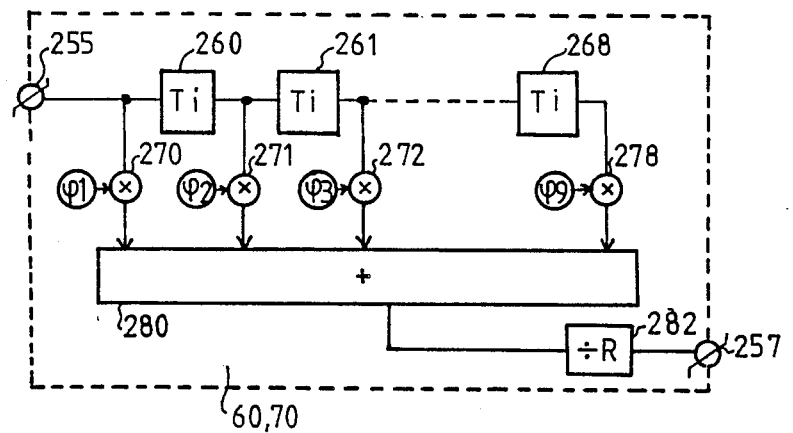
FIG. 18 is a detailed representation of the structure of a change-of-rate member.

FIG. 18 represents the structure of the change-of-rate members 60 and 70. These members utilize delay elements 260, 261 . . . 268 which each produce a delay Ti equal to 1/6 TP, so that for the member 60, the samples examined at the input 255 are formed by the significant sample followed by five samples of zero value; a single sample out of four samples will be supplied at an outer 257, while for the member 70 at the input 255, the significant sample with three samples of zero value are examined and at the output 252 one sample out of signal samples will be supplied.

The samples at an input of the element 260, at its output, and at outputs, of the subsequent elements are multiplied with the aid of multipliers 270 to 278 by the respective coefficients $\Phi_1$ to $\Phi_9$ whose values are shown in the following Table VI.

TABLE VI

| $\Phi_1$ | $\Phi_2$ | $\Phi_3$ | $\Phi_4$ | $\Phi_5$ | $\Phi_6$ | $\Phi_7$ | $\Phi_8$ | $\Phi_9$ |
|---|---|---|---|---|---|---|---|---|
| −1/27 | 0 | 3/27 | 7/27 | 9/27 | 7/27 | 3/27 | 0 | −1/27 |

An adder 280 applies the sum of the results produced by the multipliers 270 to 278 to a sampler 282, that is to say that one sample out of four samples is supplied for the case in which the member 60 is used, and one sample out of six samples for the case in which the member 70 is used, as was described hereinbefore.

Figure 19:
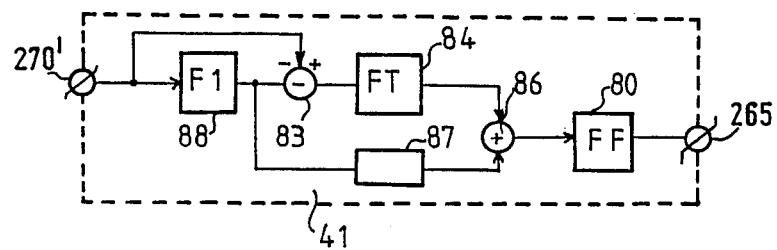
FIG. 19 is a detailed representation of the structure of an interpolation member.

FIG. 19 shows the structure of the member 41 which is formed by the same elements as those in the member 22. It should only be noted that the filter 80 is interposed between an output 265 and the adder 86, an input 270 of the member 41 being connected to the filter 88 and to the (+) input of the subtractor 83.

Figure 20:
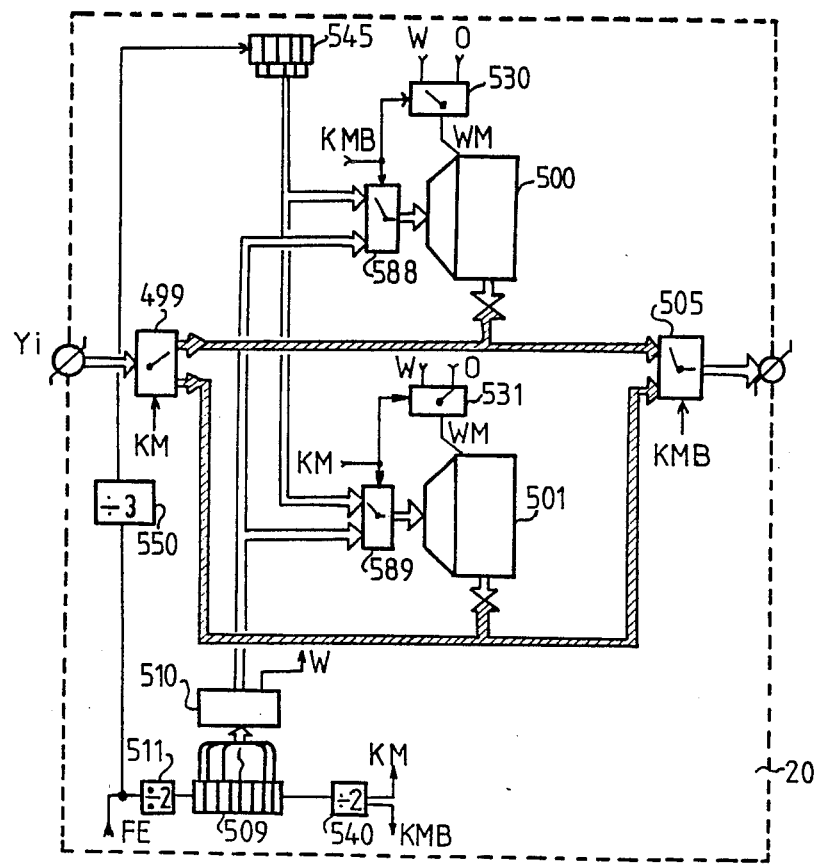
FIG. 20 is a detailed representation of the structure of a sub-sampling member.

FIG. 20 is a detailed illustration of the sub-sampling member 20.

The luminance samples filtered by the member 22 are applied to the input of a demultiplexer 499 with the object of being stored in one of the two memories 500 and 501. This storage is effected alternately in these two memories so that when one memory is in the write mode, the other memory is in the read mode. A multiplexer 505 renders it possible to apply the information components of the one of the memories 500 and 501 to the input of the circuit 5. The position of the demultiplexer 499 and the multiplexer 505 is fixed by respective complementary signals KM and KMB, thus indicating that when the information components are present at a data terminal of the memory 500, a data terminal of the memory 501 is in connection with the input of the circuit 5, and that when the data terminal of the memory 500 is in connection with the input of the circuit 5, the information components are present at the data terminal of the memory 501.

Addressing these memories 500 and 501 in the write mode is effected with the aid of a counter 509 to which a transcoding circuit 510 is connected, for the purpose of effecting a selective addressing in the memories 500 and 501 in accordance with criteria of the sampling structure in accordance with the invention. The counter 509 is incremented at the sampling rate fixed by a signal FE supplied by a divider 511 which divides by two the frequency of a 162 MHz signal provided by, for example, the camera 1. In addition to the write address code for the memories 500 and 501, the signal W is derived to enable writing of these memories; this signal is applied to the write control WM of the memories 500 and 501 via the two-position multiplexers 530 and 531 which are controlled by the signals KMB and KM, respectively. The signals KM and KMB are obtained from a bistable trigger circuit 540 connected to the end of the counter 509; as the capacity of this counter corresponds to the number of high-definition picture elements, the signals KM and KMB change their value at each new picture.

Addressing the memories 500 and 501 in the read mode is effected directly by means of a counter 545 which is incremented at the rate of the signals supplied by a frequency divider 550 which divides by three the frequency of the signal FE.

In order to apply the read or write codes, two multiplexers 588 and 589 are used, which are connected to the memories 500 and 501, respectively.

As has already been described in the foregoing, the circuit 20 applies, in three fields, the samples to the circuit 5 in the normal order described already.

Figure 21:
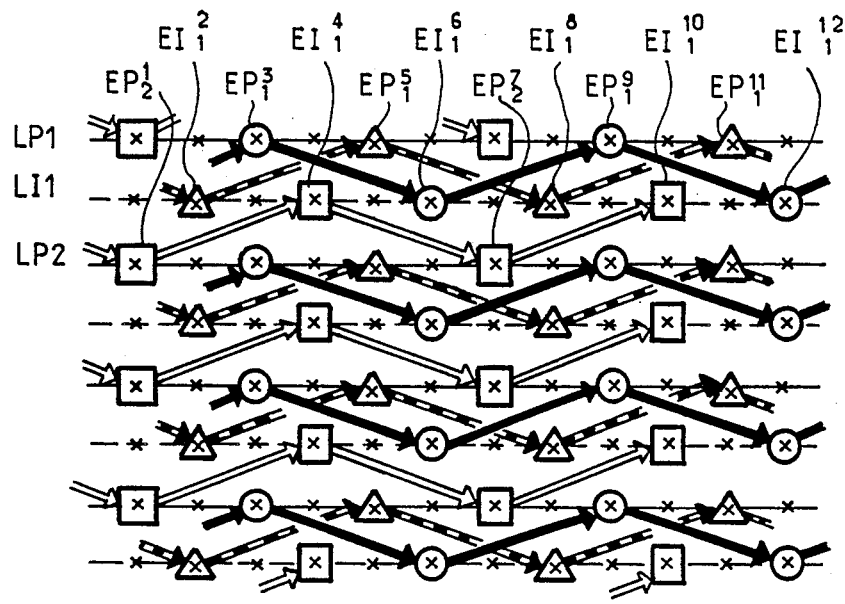
FIG. 21 shows the change of order: normal order-compatible order.

In accordance with a feature of the invention, to ensure the compatability, it is possible to program the transcoding circuit 510 in a different manner; for an explanation thereof reference is made to FIG. 21 which shows the "compatible order" suitable for the normal-definition receiver 40.

Four display fields are recorded for the television set 40. In these fields the transmitted samples, belonging to different lines, are alternately taken.

In a first field, occurring at the instants T+4kT (wherein k=0, 1, . . . , and T=the duration of each field), the samples surrounded by a circle are transmitted in the direction of the black arrows; acting thus, the samples . . . $EP^3{}_1$, $EI^6{}_1$, $EP^9{}_1$, $EI^{12}{}_1$ . . . are sequentially applied to the television set 40.

In a second field, occurring at the instants T+(2k+1)T, wherein k is even, the samples enclosed in a square are transmitted in the sequence indicated by the white arrows, namely: . . . $EP^1{}_2$, $EI^4{}_1$, $EP^7{}_2$, $EI^{10}{}_1$, . . .

In a third field, occurring at the instants $t+(4k+2)T$, the samples surrounded by a triangle are transmitted in the sequence indicated by the black and white arrows, namely: . . . $EI^2{}_1$, $EP^5{}_1$, $EI^8{}_1$, $EP^{11}{}_1$ . . .

In a fourth field, occurring at the instants $t+(2k+1)T$, wherein k is odd, the samples situated in the same positions as in the second field are transmitted, which finally forms three basic fields.

Figure 22:
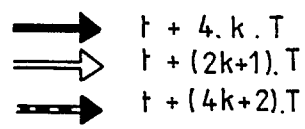
FIG. 22 is a legend for FIG. 21.

FIG. 22 shows the legends of the arrows utilized in FIG. 21.

Figure 23:
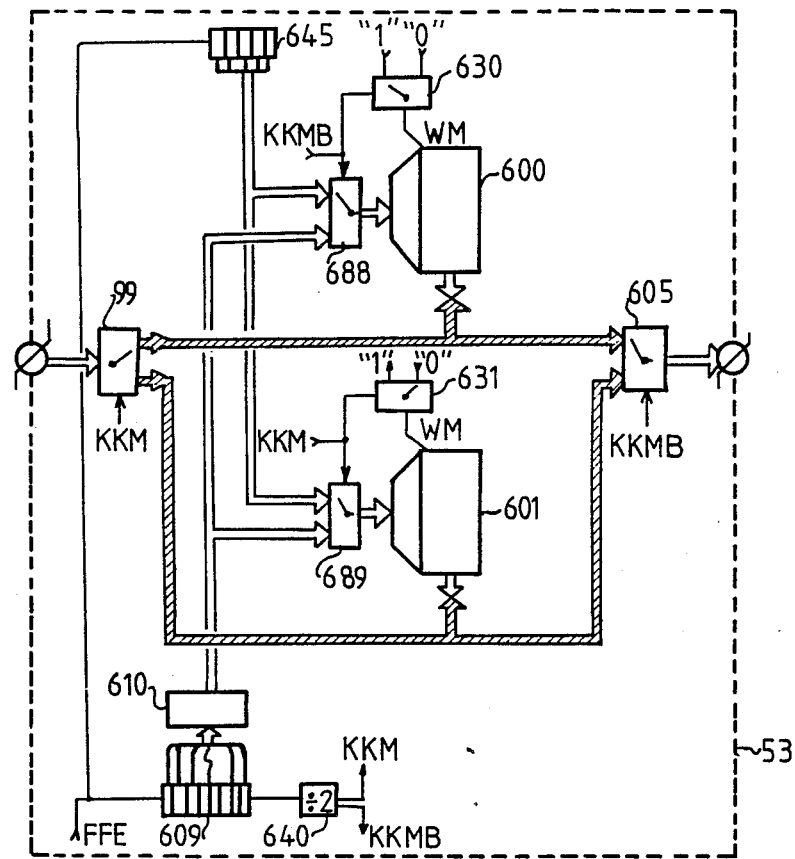
FIG. 23 shows the structure of the change-of-order member.

FIG. 23 is a detailed illustration of the structure of the change-of-order member 53. This structure relates to the luminance signal Y'.

The luminance samples Y' are applied to an input of a demultiplexer 99 with the object of being stored in one of the two memories 600 and 601. This storage is effected alternately in these two memories, so that when one memory is in the write mode, the other memory is in the read mode. A multiplexer 605 renders it possible to apply the information components of one of the memories 600 and 601 to the input of the member 70. The position of the demultiplexer 99 and multiplexer 605 is fixed by the complementary signals KKM and KKMB, respectively, thus indicating that when the information components Y' are present at a data terminal of the memory 600, a data terminal of the memory 601 is in connection with the input of the member 70, and that when the data terminal of the memory 600 is in connection with the input of the member 70, the information components Y' are at the data input of the memory 601.

Addressing and writing these memories 600 and 601 is effected by means of a counter 609 to which a transcoding circuit 610 is connected, with the object of effecting a selective addressing in the memories 600 and 601 in accordance with the criteria which re-establish the "normal order". The counter 609 is incremented at the sampling rate determined by a signal FFE coming, for example, from the circuit 10 and whose frequency is 13.5 MHz; a write signal "1" is applied to the write control WM of the memories 600 and 601, via the two-position multiplexers 630 and 631 which are controlled by the signals KKMB and KKM respectively. The signals KKM and KKMB originate from a bistable trigger circuit 640 connected to the end of the counter 609; as the capacity of this counter corresponds to the number of normal-definition picture elements, the signals KKM and KKMB change their value at each new picture.

Addressing the memories 600 and 601 in the read mode is effected directly with the aid of a counter 645 which is incremented at the rate of the signals FFE.

In order to apply the read or write code, two multiplexers 688 and 689 are used, which are connected to the memories 500 and 501, respectively.

It is easy for a person skilled in the art to obtain the transcoding circuit 610 by programming a read-only memory on the basis of considerations of the description of the "normal order" and the "compatible order".

By way of summary, the picture produced by the camera is a 1250 line picture with a 2:1 interlace, the picture elements appearing at a frequency of 54 MHz. After having passed through the filter FF80, a 625-line, non-interlaced 1:1 picture is obtained, the picture elements appearing at a frequency equal to 54 MHz. Using the member 60, the frequency is raised to 81 MHz. The sub-sampling 20 member produces a 625-line picture, with 2:1 interlace and a picture element frequency of 13.5 MHz. On reception, the receiving change-of-rate member 70 reconverts, by insertion of virtual "0" values, the transmitted 625-line pictures having an interlaced factor 2:1 with a picture element frequency equal to 13.5 MHz into a 625-line picture having an interlace factor 1:1 and a picture element frequency of 54 MHz before submitting it to an interpolation operation which produces a 1250-line picture having an interlace factor 1:1 and a picture element frequency equal to 54 MHz for the television set 50.

What is claimed is:

1. A system for the transmission of high definition television pictures via a relatively narrow passband channel, the system comprising a transmission part including a picture pick-up member for providing said pictures which are constituted by a plurality of picture samples distributed over even and odd lines, a filter member for filtering said samples, a sub-sampling circuit for taking certain samples of said filtered samples from the output of the filter member, and a transmission circuit for transmitting said certain samples via the channel in transmission fields, and also at least one receiving part including a receiving circuit for receiving the certain samples transmitted by the transmission circuit, an interpolation member for reproducing samples on the basis of said received certain samples, and a first display circuit for reconverting the reproduced samples and the received certain samples into a restored high-definition picture, characterized in that the sub-sampling circuit comprises means for sampling first samples during first field periods, second samples during second field periods, and third samples during third field periods; and means for applying said first, second and third samples during said first second and third field periods, respectively, to said transmission circuits, wherein the sub-sampling circuit takes, in sequence of six samples which succeed each other in the lines and are shifted from one line to the other, the first sample of each sequence for the first field, the fifth sample for the second field and the third sample for the third field and to apply them in this "normal" order to the transmission circuit.

2. A system for the transmission of high definition television pictures via a relatively narrow passband channel, the system comprising a transmission part including a picture pick-up member for providing said pictures which are constituted by a plurality of picture samples distributed over even and odd lines, a filter member for filtering said samples, a sub-sampling circuit for taking certain samples of said filtered samples from the output of the filter member, and a transmission circuit for transmitting said certain samples via the channel in transmission fields, and also at least one receiving part including a receiving circuit for receiving the certain samples transmitted by the transmission circuit, an interpolation member for reproducing samples on the basis of said received certain samples, and a first display circuit for reconverting the reproduced samples and the received certain samples into a restored high-definition picture, characterized in that the sub-sampling circuit comprises means for sampling first samples during first field periods, second samples during second field periods, and third samples during third field periods; and means for applying said first, second and third samples during said first second and third field periods, respectively, to said transmission circuits, wherein the sub-sampling circuit takes, in sequences of six samples which succeed each other in the lines and are shifted from line to line, the first sample of each sequence for the first field, the fifth sample for the second field and the third sample for the third field in a "normal" order, and applies said first, second and third samples in a "compatible" order to the transmitting circuit, said "compatible" order consisting of a series of samples for a second display circuit in four display fields the first field being formed by first transmitted samples of said sequences, taken alternately from one line and a subsequent line, the second field being formed by fifth transmitted samples of the sequences, taken alternately from one line and the subsequent line;

the third field being formed by third transmitted samples of the sequences taken alternately from one line and the subsequent line, and the fourth field being formed by the fifth transmitted samples of the sequences, taken alternately from one line and the subsequent line, said receiving part further including a change-of-order member to establish said "normal" order at the input of the interpolation member.

3. A transmitter for the transmission of high definition television pictures via a relatively narrow passband channel, the transmitter including a picture pick-up member for providing said pictures which are constituted by a plurality of picture samples distributed over even and odd lines, a filter member for filtering said samples, a sub-sampling circuit for taking certain samples of said filtered samples from the output of the filter member, and a transmission circuit for transmitting said certain samples via the channel in transmission fields, characterized in that said sub-sampling circuit comprises means for sampling first samples during first field periods, second samples during second field periods and third samples during third field periods; and means for applying said first, second and third samples during said first, second and third fields, respectively, to said transmission circuit, wherein said sub-sampling circuit takes, in sequences of six samples which succeed each other in the lines and are shifted from one line to the other, the first sample of each sequence for the first field, the fifth sample for the second field and the third sample for the third field in the "normal" order, and applies said first, second and third samples in said "normal" order to the transmission circuit.

4. A transmitter for the transmission of high definition television pictures via a relatively narrow passband channel, the transmitter including a picture pick-up member for providing said pictures which are constituted by a plurality of picture samples distributed over even and odd lines, a filter member for filtering said samples, a sub-sampling circuit for taking certain samples of said filtered samples from the output of the filter member, and a transmission circuit for transmitting said certain samples via the channel in transmission fields, characterized in that said sub-sampling circuit comprises means for sampling first samples during first field periods, second samples during second field periods and third samples during third field periods; and means for applying said first, second and third samples during said first, second and third fields, respectively, to said transmission circuit, wherein said sub-sampling circuit takes, in sequences of six samples which succeed each other in the lines and are shifted from one line to the other, the first sample of each sequence for the first field, the fifth sample for the second field and the third sample for the third field in a "normal" order, and applies said first, second and third samples in a "compatible" order to the transmission circuit, said "compatible" order consisting of a re-ordered series of said first, second and third samples in four display fields, the first field being formed by first transmitted samples of said sequences, taken alternately from one line and a subsequent line; the second field being formed by fifth transmitted samples of the sequences, taken alternately from one line and the subsequent line; the third field being formed by third transmitted samples of the sequences, taken alternately from one line and the subsequent line; and the fourth field being formed by the fifth transmitted samples of the sequences, taken alternately from one line and the subsequent line.

5. A receiver for displaying high definition television pictures transmitted via a narrow passband channel, said pictures being constituted by a plurality of picture samples distributed over even and odd lines, said picture samples being first filtered and then by means of a sampling process, certain samples of the filtered samples being transmitted on the channel, wherein said sampling process includes sampling first samples during first field periods, second samples during second field periods, and third samples during third field periods, characterized in that said receiver comprises a receiving circuit for receiving the first, second and third samples transmitted over said channel; an interpolation member for reproducing samples on the basis of said received first, second and third samples; and a first display circuit for reconverting said reproduced samples and said received first, second and third samples into a restored high definition picture, wherein said sampling process takes, in sequences of six samples which succeed each other in the lines and are shifted from one line to the other, the first sample of each sequence for the first field, the fifth sample for the second field and the third sample for the third field in a "normal" order.

6. A receiver for displaying high definition television pictures transmitted via a narrow passband channel, said pictures being constituted by a plurality of picture samples distributed over even and odd lines, said picture samples being first filtered and then by means of a sampling process, certain samples of the filtered samples being transmitted on the channel, wherein said sampling process includes sampling first samples during first field periods, second samples during second field periods, and third samples during third field periods, characterized in that said receiver comprises a receiving circuit for receiving the first, second and third samples transmitted over said channel; an interpolation member for reproducing samples on the basis of said received first, second and third samples; and a first display circuit for reconverting said reproduced samples and said received first, second and third samples into a restored high definition picture, wherein said sampling process takes, in sequences of six samples which succeed each other in the lines and are shifted from one line to the other, the first sample of each sequence for the first field, the fifth sample for the second field and the third sample for the third field in a "normal" order, and applies said first, second and third samples in a "compatible" order to the channel, said "compatible" order consisting of a re-ordered sequence of said first, second and third samples in four display fields, the first field being formed by first transmitted samples of said sequences, taken alternately from one line and a subsequent line; the second field being formed by fifth transmitted samples of the sequences, taken alternately from one line and the subsequent line; the third field being formed by third transmitted samples of the sequences, taken alternately from one line and the subsequent line; and the fourth field being formed by the fifth transmitted samples of the sequences, taken alternately from one line and the subsequent line, and in that said receiver further comprises a change-of-order member for re-establishing said "normal" order at the input of the interpolation member.

* * * * *